March 27, 1928.
N. W. McLACHLAN ET AL
1,664,039
WIRELESS TELEGRAPH RECEIVING APPARATUS
Filed Nov. 24, 1922
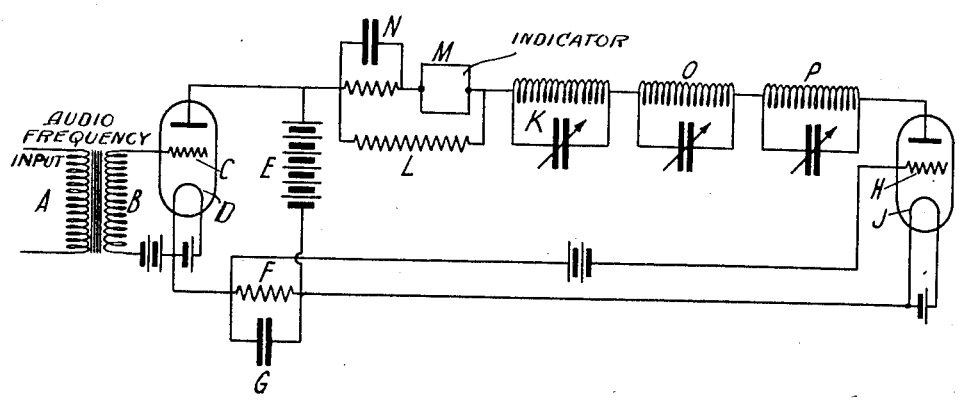
Inventors
NORMAN W. McLACHLAN
ARCHIE W. LANGRIDGE
By their Attorney Patented Mar. 27, 1928.

1,664,039

UNITED STATES PATENT OFFICE.

NORMAN WILLIAM McLACHLAN, OF NEWCASTLE-UPON-TYNE, AND ARCHIE WILLIAM LANGRIDGE, OF SHIPLEY, ENGLAND, ASSIGNORS TO RADIO CORPORATION OF AMERICA, A CORPORATION OF DELAWARE.

WIRELESS-TELEGRAPH RECEIVING APPARATUS.

Application filed November 24, 1922, Serial No. 603,028, and in Great Britain December 7, 1921.

The object of this invention is to provide wireless telegraph receiving apparatus comprising a recorder or other indicating means which is protected from alternating currents.

In order that the invention may be the more readily understood, we will describe it with reference to the accompanying drawing, the single figure of which is a diagrammatic representation of a circuit arrangement embodying the invention.

According to the invention, the signals after being heterodyned and rectified to give oscillations of audio frequency are brought to a circuit A which is coupled electromagnetically to a coil B connected between the grid C and filament D of a vacuum tube whose grid potential is adjusted so that the oscillations are rectified. Its anode circuit contains a battery E and a resistance F shunted by a condenser G. A series of impulses whose frequency is equal to that of the signal current is thus obtained in the anode circuit. These impulses are unidirectional and can be resolved into a steady current on which are superimposed alternating currents of various frequencies. The steady current will pass through the resistance F and the alternating current will pass chiefly through the condenser G which will reduce the fluctuation of potential due to alternating current across the resistance F.

The ends of the resistance F are connected to the grid H and filament J of a second vacuum tube whose grid potential is adjusted to the rectifying point and the anode circuit of which is arranged in parallel with the anode circuit of the first tube with respect to the battery E. In the anode circuit of the second tube is connected a rejector circuit K in series with a second resistance L which latter is shunted by the relay, recorder M or other indicating means and a shunted condenser N. In order to prevent alternating current from flowing through the indicator M, the rejector circuit K is tuned to the frequency of the currents applied to the first tube so that it offers a high impedance to alternating current of that frequency while acting as a short circuit to the direct current component of the current in the anode circuit of the second valve. In order still further to reduce the alternating current through the relay or recorder additional rejector circuits O. P, may be employed tuned to harmonics of the main frequency.

Having described our invention, what we claim is:

1. In wireless telegraph receiving apparatus, the combination of two rectifying vacuum tubes, a resistance shunted by a condenser and connected in the anode circuit of the first tube and also in the grid circuit of the second tube, indicating means shunted by a resistance in the anode circuit of the second tube, and a rejector circuit in this anode circuit.

2. In wireless telegraph receiving apparatus, the combination of two rectifying vacuum tubes having their anode circuits connected in parallel, a battery common to both of the anode circuits, a resistance shunted by a condenser and connected in the anode circuit of the first tube and also in the grid circuit of the second tube, indicating means shunted by a resistance in the anode circuit of the second tube, and means in the anode circuit of the second tube for preventing alternating current from flowing from the anode circuit of the first tube to the indicating means.

3. In wireless telegraph receiving apparatus, the combination of two rectifying vacuum tubes having their anode circuits connected in parallel, a battery common to said anode circuits, a resistance shunted by a condenser and connected in the anode circuit of the first tube and also in the grid circuit of the second tube, a recorder shunted by a resistance in the anode circuit of the second tube, and rejector circuits in the anode circuit of the second tube tuned respectively to the fundamental frequency of the anode circuit of the first tube and to harmonics of the fundamental frequency to prevent alternating current from flowing from the last-mentioned anode circuit to the recorder.

4. In wireless telegraph receiving apparatus the combination of a receiver delivering audio frequency oscillations, two rectifying vacuum tubes, the first having its input coupled to said receiver, a resistance connected in its output circuit and in the input circuit of the second tube, indicating means in the output circuit of the second tube and a rejector circuit tuned to the input audio frequency and connected in the output circuit of the second tube.

5. In wireless telegraph receiving apparatus the combination of two vacuum tubes having their anode circuits connected in parallel, a battery common to the anode circuits and separate batteries for the filaments of the tubes, a resistance connected in the anode circuit of the first tube and also in the grid circuit of the second tube, indicating means in the anode circuit of the second tube and means in the anode circuit of the second tube for preventing alternating current from flowing in the anode circuit of the second tube to the indicating means.

6. In receiving apparatus, the combination of means for supplying an audio frequency current, a rectifying vacuum tube having its input coupled to said means, a direct current indicator in the output circuit and rejector circuits in said output circuit tuned respectively to the fundamental input frequency and to harmonics thereof for preventing alternating current from flowing through the indicator.

7. In radio receiving apparatus the combination of means for supplying an audio frequency current, a rectifying vacuum tube having its input coupled to said means, a direct current indicator in the output circuit, a resistance shunted by a condenser in series with said indicator, a resistance in shunt to said indicator and resistance shunted by a condenser and means in the output circuit for preventing alternating current of the input frequency from flowing in said anode circuit to the indicating means.

NORMAN WILLIAM McLACHLAN.
ARCHIE WILLIAM LANGRIDGE.